Figures 2, 3:
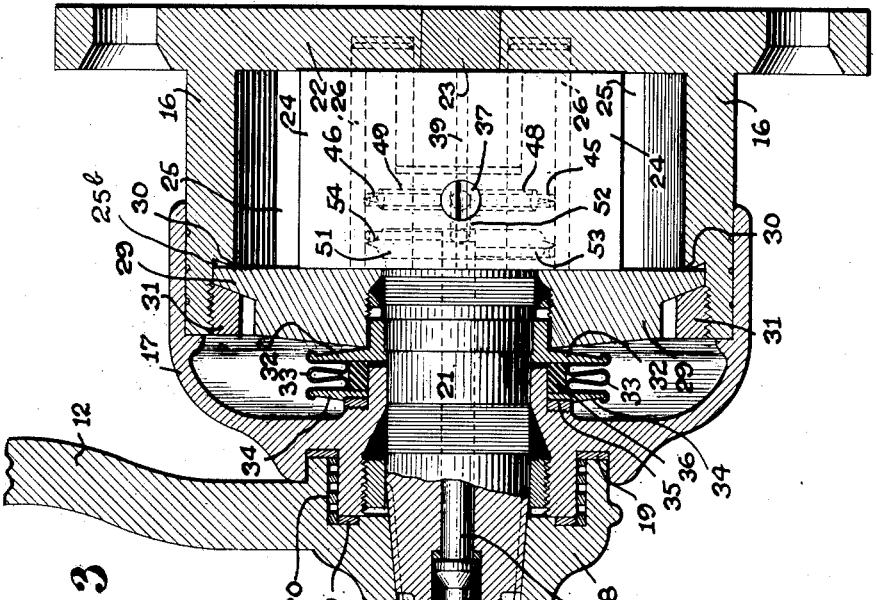

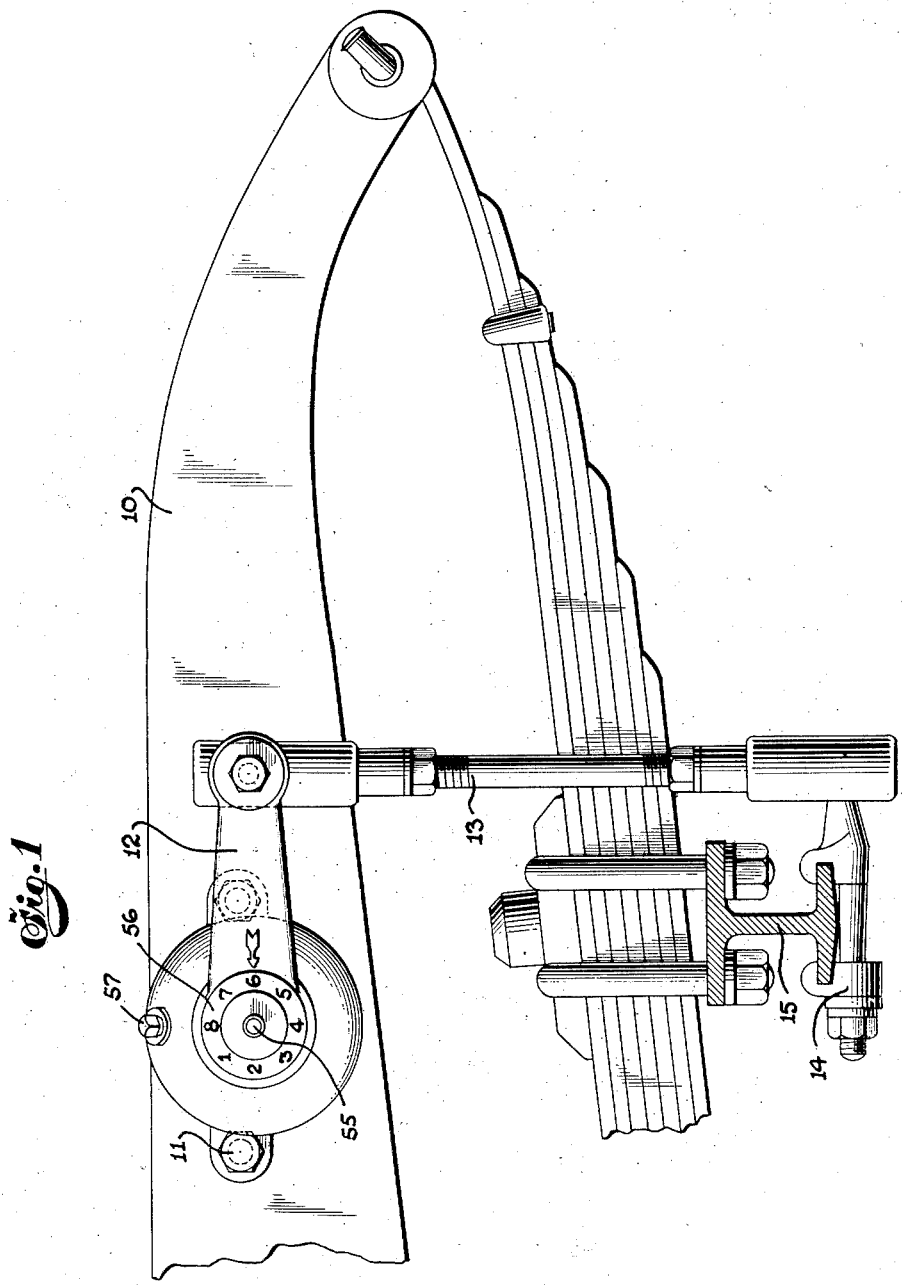

March 5, 1929.　　　P. S. MORGAN　　　1,704,258
SHOCK ABSORBER
Original Filed Dec. 16, 1924　　3 Sheets-Sheet 2

Inventor
Porter S. Morgan.
By his Attorneys
Emery, Booth, Janney & Varney

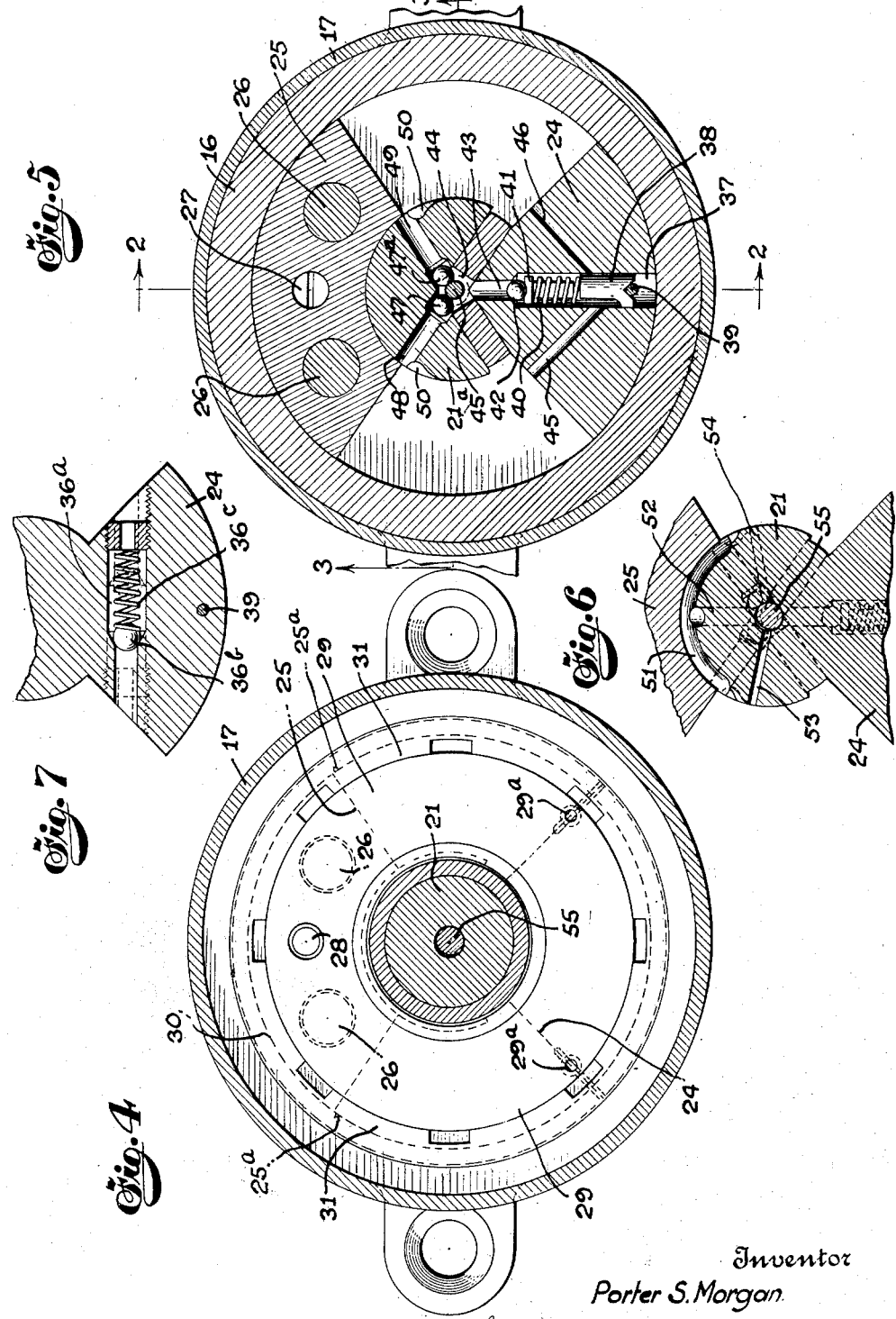

Patented Mar. 5, 1929.

1,704,258

UNITED STATES PATENT OFFICE.

PORTER S. MORGAN, OF DARIEN, CONNECTICUT, ASSIGNOR TO MORGAN, BLODGETT, MORGAN, INC., OF NEW YORK, N. Y., A CORPORATION OF NEW YORK.

SHOCK ABSORBER.

Application filed December 16, 1924, Serial No. 756,198. Renewed December 16, 1926.

This invention purposes the improvement of shock absorbing devices adapted to reduce and control the communication of movements or shocks from one element to another. The accompanying drawings exhibit, as one illustrative embodiment of the invention, a hydraulic shock absorber, particularly applicable to automobiles and other spring-supported vehicles.

In the drawings of the present embodiment Figure 1 is a front elevation, reduced in size, showing the absorber attached to the automobile frame or body and operatively connected with the axle or running-gear; Figure 2 is a vertical section taken on the line 2—2 of Figure 5; Figure 3 is a horizontal section taken on the line 3—3 of Figure 5, both Figures 2 and 3 leaving certain parts in elevation; Figure 4 is a section taken on the line 4—4 of Figure 2; Figure 5 is a section taken on the line 5—5 of Figure 2; Figure 6 is a fragmentary view showing the relative relation of various elements; and Figure 7 is a similar view taken on a different plane to show certain other elements.

Referring to Figure 1, the absorber proper is adapted to be firmly secured to the automobile body or frame 10 in any usual manner, as by bolts 11. The operative connection between the absorber and the running-gear comprises the oscillatory arm 12, the pitman 13 and the clamp member 14 arranged for attachment to the axle 15. In practice the connections between the arm 12, the pitman 13, and the clamp member 14 are of the universal type to permit proper freedom in certain relative movements of the frame and running-gear.

As best shown in Figures 2 and 3, the operating parts of the absorber are housed within the cylindrical casing 16, upon which is tightly pressed the cover 17 shaped to effect the closure of the casing and to afford an annular bearing for the hub 18 of the arm 12.

Between adjacent surfaces of the cover 17 and the hub 18 suitable packing 19 may be provided, together with a perforated lubricating ring 20 which may be charged with graphite, or other lubricating material.

The hub 18 of the arm 12 has a central opening grooved to interlock with similar complementary ribs formed upon the spindle 21 near its outer end, as specifically illustrated in the patent hereinbefore mentioned, particularly in Fig. 5 thereof, and may be secured axially to the spindle 21 by the nut 18$^a$ threaded upon the exterior extremity of the spindle 21.

The spindle 21 is the chief moving element of the absorber, and, suitably packed and journalled in the central opening of the cover 17, occupies an axial position within the absorber casing and terminates with its inner end against the casing base 22. In the center of the casing base 22 is fixed a bearing post 23 which fits into and forms a bearing for the inner end of the central spindle 21, permitting the latter to be oscillated relatively to the casing and casing cover.

As best shown in Figures 2 and 5, the central spindle 21 is provided at its inner end with a segmental wing 24, operatively integral with the spindle. The peripheral surface of this segmental wing 24 is contiguous and concentric with the inner wall of the casing 16, so that as the spindle 21 is oscillated the wing 24 is oscillated in the manner of a close-fitting piston in a semi-circular chamber, its limits of oscillatory movement being determined by the arcuate abutment 25.

This abutment 25 is firmly fixed to the absorber casing 16 by means of dowel-pins 26 pressed through openings through the abutment and into sockets bored in the casing base 22.

Midway between the dowel pins 26 is the flat-ended jack-screw 27, shown in side elevation in Figure 2, threaded through the abutment 25. This jack-screw 27 may be used to facilitate the removal of the abutment 25 from the absorber casing.

In axial alignment with the jack-screw 27 is the dowel pin 28 (see Figures 2 and 4), one end of which fits into an opening in the abutment 25, while the other end fits into an opening in the annular closure plate 29. This annular closure plate 29, locked against rotary movement by the dowel pin 28, is peripherally seated against the circumferential shoulder or ledge 30 formed within the inner edge of the wall of the casing 16, where it is held against displacement by the annular locking gland 31 (Figures 2, 3, and 4) which is screw-threaded within the inner edge of the casing wall and serves to hold the closure plate 29 tightly in place.

The annular closure plate 29 divides the absorber to form a reservoir space and a piston chamber, encloses the oscillatory wing piston 24 within the latter, and surrounds and forms another bearing for the central spindle 21, suitable packing means being provided between the adjacent surfaces of the spindle and closure plate. The closure plate 29 is pierced by two passages 29ª controlled by ball valves providing one-way passage from the reservoir space of the absorber into the piston chamber.

To prevent leakage along the surface of the central spindle 21, special ancillary packing means may be employed if necessary, as by tightly mounting upon and around the spindle the annular packing-collar 32 shaped to hold an annular spring web or accordion sleeve 33 which, through the medium of a flat ring 34, presses a concentrically grooved lead or Babbitt metal annulus 35 against a similarly grooved circular surface upon the interior of the casing cover 17. Between the ring 34 and the collar 32 may be placed, as further packing, a rubber ring 36, which may also, by being compressed, serve to augment the impingement of the annulus 35 against the grooved surface upon which the annulus bears. The annulus 35, its supporting ring 34, the web 33, and the collar 32 are so assembled as to be operatively integral, and to oscillate with the central spindle 21, to which the collar 32 is firmly fixed.

Referring particularly to Figures 2 and 7, the wing piston 24 is pierced from side to side by two parallel passages 36ª, one arranged to permit the passage of fluid in one direction, the other, oppositely disposed, to permit passage in the opposite direction. Usual ball valves 36ᵇ, held in position by relatively heavy pressure springs 36ᶜ, control these passages.

Referring particularly to Figures 2 and 5, the wing piston 24 is further provided with a radial passage 37 containing the plug 38 notched to fit the dowel pin 39, which, pressed through a suitable opening in the wing piston 24, serves to maintain the plug 38 in proper position. Resting against the inner end of the plug 38 is a helical pressure spring 40, which, through the medium of the plunger 41, presses the ball 42 against the orifice of the passage 43, which forms an axial continuation of the passage 37 and leads to the valve chamber 44 centrally located within the spindle 21.

The wing piston 24 is also provided with two other passages 45 and 46, running respectively from the radial faces of the wing piston to the passage 37. The plug 38 is provided with a lateral groove shown in Figure 5 adjacent to and clearing the inner orifice of the passage 45, the opposite plane side of the plug 38 serving to close the corresponding orifice of passage 46. The plug 38 may, however, be removed, turned and replaced in such position that its grooved side will be adjacent to and clear the inner orifice of the passage 46.

In this manner communication may be provided from the central valve chamber 44, through the passage 43, past the ball 42, through the passages 37 and 45 to one end of the piston chamber; or, the plug 38 being reversed, through the passage 46 to the other end of the piston chamber.

Fixed through the center of the central valve chamber 44 is the pin 45ª, which retains in operative position the two balls 47 and 47ª. These balls serve respectively as valves to close and control the passages 48 and 49 bored radially from the surface of the spindle 21 to its interior central valve chamber 44. The outer orifices of the passages 48 and 49 are elongated by tapering grooves 50 cut in the outer surface of the spindle 21.

Also cut in the outer surface of the spindle 21 (see Figure 6), and in a plane perpendicular to the axis of the spindle, is the channel 51, the ends of which are also elongated and tapered similarly to the outer orifices of the passages 48 and 49. Leading from the middle of the channel 51 to the central valve chamber 44, is the passage 52. The conjunction of the channel 51, passage 52, valve chamber 44, and passages 48 and 49, may provide communication from one end of the piston chamber to the other through passage 48, past the ball 47, through passage 52 and channel 51; or in the reverse direction, through passage 49, past the ball 47ª, through passage 52 and channel 51. Further, while the parts occupy the position shown in the drawings, free passage between the opposite ends of the piston chamber is also provided by the channel 51 alone, its extremities extending somewhat beyond the radial faces of the abutment 25.

Still referring to Figure 6, two other radial passages 53 and 54, lying in different radial planes, are provided in the spindle 21. The inner orifices of these passages terminate in the end portion of a central axial bore drilled from the outer end of the spindle 21. Rotatably fitted within this axial bore is the valve stem 55, the inner end of which is formed eccentrically and which, while terminating short of the inner orifice of the passage 54, may according to its rotative position, adjustably restrict the effective opening of the passage 53. Thus further and adjustably controlled communication from one end of the piston chamber to the other may be provided through passage 54, past and around the eccentric end of the valve stem 55, and through passage 53, or vice versa.

The outer end of the valve stem 55 may be suitably packed in the spindle 21, from which it projects. Fixed to the outer end of the valve stem 55 is an indicator cap or disc 56, which may be turned to rotate the valve stem 55 to any desired position.

In operation, any suitable fluid, such as oil, is used as the hydraulic agent and may be introduced into the reservoir portion of the absorber (see Figure 2) through an opening in the cover 17 shown closed by the plug 57.

Oil thus introduced into the reservoir chamber of the absorber enters the piston chamber through the passages 29ª, wherein the ball valves prevent any return of oil from the piston chamber. Thus repeated oscillations of the central spindle 21 and its wing piston 24 pump oil from the reservoir chamber into the piston chamber until the latter is substantially or wholly filled.

Provision for the displacement of air contained in the piston chamber is illustrated in Figure 4 wherein are shown, just beyond each end of the abutment 25, small notches 25ª cut in the edge of the ledge or shoulder 30. Referring to Figure 2, it will be noted that this ledge 30 is so shaped as to provide an annular channel 25ᵇ between the periphery of the closure plate 29 and the ledge 30, this channel, by means of the notches 25ª, being in constant communication with the piston chamber.

Referring to the lower portion of Figure 2, where the periphery of the closure plate 29 is shown in section, a small groove 25ᶜ is provided in the closure plate and adjacent to the annular locking gland 31.

The closure plate 29 is of such diameter as to permit leakage of air between its extreme periphery and the casing wall 16. Thus air in the piston chamber may be forced through the notches 25ª, around the annular channel 25ᵇ, past the edge of the closure plate 29, and through the groove 25ᶜ into the reservoir of the absorber.

When the piston chamber has thus been substantially emptied of air and filled with oil, it is in condition for operation.

In the drawings the various parts are shown in the normal, intermediate position which they ordinarily occupy when the vehicle is not in motion.

The general principle of the absorber's operation consequent upon the vehicle passing over material road irregularities contemplates relatively unretarded initial upward movements of the vehicle axle 15 from its normal intermediate position toward the vehicle body or frame 10, return downward movements toward normal position being relatively retarded; and relatively unretarded initial downward movements of the vehicle axle 15 from its normal position away from the vehicle body or frame 10, return upward movements toward normal position being relatively retarded.

As is known in the most modern shock absorber practice, inconsequential vibrations or "ripples" caused by relatively small road irregularities should not be materially damped by the absorber, and for that reason (see Figure 6) the channel 51 is made to over-reach the faces of the abutment 25 at each end—permitting free flow of oil through this channel in both directions throughout limited oscillations of the wing piston 24 to the right or left.

But when the vehicle encounters a hummock sufficiently pronounced to raise the axle 15 to a considerable extent, the wing piston 24 (as best shown in Figures 5 and 6) turns counterclockwise, the right-hand end of the channel 51 being retreated past the adjacent face of the abutment 25, thus closing that end of the channel 51. However, continued passage of oil from in front of the advancing wing piston to the other end of the piston chamber is still provided by the elongated orifice 50 of the passage 49, which admits the escaping oil into the passage 49, past the ball 47ª into the central valve chamber 44 where it seats the ball 47 but is free to pass through passage 52 into the channel 51 to the then low-pressure side of the piston chamber.

With the further advance of the wing piston 24, the tapering orifice 50, retreating past the face of the abutment 25, progressively diminishes its opening, so that the oil escapes therethrough with gradually increasing difficulty, until at length no further oil escape is possible, and the counter-clockwise motion of the wing piston 24 is arrested.

In this manner, while the vehicle axle is permitted a certain range of free upward movement from its normal position toward the vehicle body or frame 10, that upward movement is gradually and progressively resisted, from a certain point on, until it is finally arrested to prevent the axle striking against the vehicle frame.

When, however, the vehicle axle and frame begin their subsequent separating movement under the urge of the recoiling vehicle spring, strong resistance to this movement is interposed by the absorber. The wing piston 24, now impelled in the clockwise direction, compresses the oil in the left-hand end of the piston chamber. Oil, under pressure, flows into passage 48 past the ball 47, seats the ball 47ª and finds no egress through passage 52, since the right-hand end of channel 51 is covered and closed by the abutment 25. For the same reason, no oil entering the open left-hand end of the channel 51 can pass through the channel.

The only escape for the compressed oil lies through the small passage 53, past the eccentric adjusting valve formed upon the inner end of the stem 55, through passage 54 and into the right-hand end of the piston chamber, now the low-pressure side. The speed at which oil can flow through these passages 53 and 54, and, consequently, the speed at which the vehicle axle and frame can effect the beginning of their separating movement, depends upon the position of the eccentric adjusting valve.

But when the slowly moving wing piston has continued its resisted clockwise movement far enough to advance the right-hand tapering end of channel 51 past the face of the abutment 25, oil begins to escape through channel 51, its passage becoming progressively freer until the parts have nearly reached their normal intermediate position and resistance ceases.

When the vehicle axle, instead of rising toward the vehicle frame consequent upon the vehicle encountering a hummock, drops downwardly from its normal position consequent upon the vehicle encountering a depression in the road, the resultant opposite operation of the absorber parts permits the axle to drop freely for a certain distance. Oil in the left-hand end of the piston chamber, driven by the clockwise advance of the wing piston 24, passes into the left-hand end of channel 51, through the channel and out into the right-hand, low pressure end of the piston chamber. Continued clockwise movement of the wing piston closes the left-hand end of channel 51, but permits a gradually lessening oil flow through the tapered orifice 50, passage 48, passage 52, and right-hand portion of channel 51.

Thus further separating movement of the vehicle frame and axle, with its consequent over-distention of the vehicle spring, is resisted and finally arrested; and the subsequent return approaching movement of the vehicle frame and axle are now governed by the limited return flow of oil through passage 54, past the eccentric adjusting valve, and through passage 53, until the left-hand end of channel 51 is uncovered and thereby resistance gradually relieved.

To relieve sudden stresses sometimes caused by the vehicle encountering a deep depression followed by an abrupt hummock, supplementary oil passages 43, 45 and 46 are provided whereby sudden pressure in the piston chamber may be relieved by the oil flowing either through passage 48, or through passage 49, into passage 43, overcoming the resistance of the spring-pressed ball valve 42, flowing into passage 37 and out either through passage 45, or through passage 46, in accordance with whether the plug 38 is set with its grooved side to the right or left.

The reversibility of the plug 38 permits the absorber to be mounted upon either side of the vehicle without other change or adjustment than inverting the plug.

To insure the absorber against injury from extraordinarily violent pressures due to abusive driving over very rough roads, or to cold, slow-flowing oil, or to other conditions of road, vehicle or absorber, the relatively large emergency oil passages 36ª are provided through the piston 24, permitting oil to flow from either side of the piston to the other if under sufficient pressure. Under ordinary working conditions the relatively strong springs 36ᶜ keep these passages closed by the ball valves 36ᵇ, but they are adapted to yield under pressures otherwise sufficient to injure the absorber.

The invention is not limited to the specific illustrative embodiment hereinbefore described.

Claims:

1. A hydraulic shock absorber for spring-supported vehicles comprising in combination a main absorber body containing a piston chamber and a reservoir chamber, means for attaching the absorber body to one of two relatively movable parts of the vehicle, an oscillatory arm, having a normal intermediate position, operatively connecting the absorber to the other of said parts of the vehicle, a wing piston operatively integral with and having a normal intermediate position corresponding to that of said arm and adapted to oscillate within the piston chamber, passages to permit the free flow of oil from one side of the wing piston to the other during movements of the piston in both directions on both sides of its normal intermediate position for limited distances and to permit continued free flow of oil during more extended movements of the piston in directions away from its normal intermediate position, means to restrict the opposite flow of oil consequent upon movements of the piston in directions toward its normal intermediate position, adjusting means extending to the outside of the absorber to control and adjust such last-named flow, auxiliary oil-escape means to permit the flow of oil from one side of the piston to the other under extraordinarily high pressures, and means whereby oil may be drawn from the reservoir chamber into the piston chamber, but not returned to the reservoir chamber, upon the operation of the piston.

2. A hydraulic shock absorber for spring-supported vehicles comprising in combination an absorber casing containing a piston chamber and a reservoir chamber, means for connecting said casing to one of two relatively movable vehicle parts, a wing piston adapted to oscillate and having a normal intermediate position within said piston chamber, an oscillatory arm operatively connecting said piston with the other of said vehicle parts whereby relative movements between said parts impart corresponding movements to said piston, passages to permit the free flow of fluid from one side of said piston to the other during movements of said piston in both directions on both sides of its said normal intermediate position for limited distances and to permit continued free flow of fluid during more extended movements of the piston in directions away from its normal intermediate position, means to restrict the opposite flow of fluid consequent upon movements of said piston in directions toward its normal intermediate position, adjusting means to control such last-named flow, and means whereby fluid may be drawn from said reservoir chamber into said piston chamber upon operation of said piston.

3. A vehicle shock absorber comprising in combination a piston chamber and a wing-piston operative therein in response to relative movements of the vehicle body and axle, and adapted to permit a relative movement of the body and axle in either direction from a normal intermediate position, said device producing a retarding effect upon return movements in either direction toward such position and a lesser or no retarding effect upon the initial movements away from such normal position, and means for adjusting the degree of the first-named retarding effect extending to the exterior of the device.

4. A shock absorber for vehicles comprising in combination a piston chamber and a wing-piston adapted to operate therein in response to relative movements of the vehicle body and axle, and adapted to permit relatively free movements in both directions for a limited range on both sides of a normal intermediate position, and relatively free movements beyond said range in directions away from said normal position, said device having means whereby a retarding effect may be produced upon return movements toward such normal position on both sides of such position when such return movements take place beyond said range, and means to adjust the degree of such retarding effect extending to the exterior of the device.

5. A shock absorber for vehicles comprising in combination a piston chamber and a wing-piston adapted to operate therein in response to relative movements of the vehicle body and axle, and adapted to permit relatively free movement of the body and axle away from a normal intermediate position, said device having means whereby a retarding effect may be produced upon the continuation of said movements beyond a certain point or points and whereby a retarding effect may be produced upon the return movements toward such said normal position, and means for adjusting the degree of such retarding effect extending to the exterior of the device.

6. A shock absorber for vehicles comprising in combination a piston chamber and a wing-piston adapted to operate therein in response to relative movements of the vehicle body and axle, and adapted to permit a relatively free movement of the body and axle away from a normal intermediate position for a certain distance, said device having means whereby a retarding effect may be produced upon the continuation of said movement beyond said distance, means whereby a retarding effect may be produced upon the commencement of the return movement toward said normal position, and means for adjusting the degree of such retarding effect extending to the exterior of the device.

In testimony whereof, I have signed my name to this specification this 9th day of December, 1924.

PORTER S. MORGAN.